Feb. 19, 1957  YAO T. LI  2,781,665
MOTION TRANSMITTING MEANS FOR PRESSURE DEVICES
Filed Jan. 23, 1953
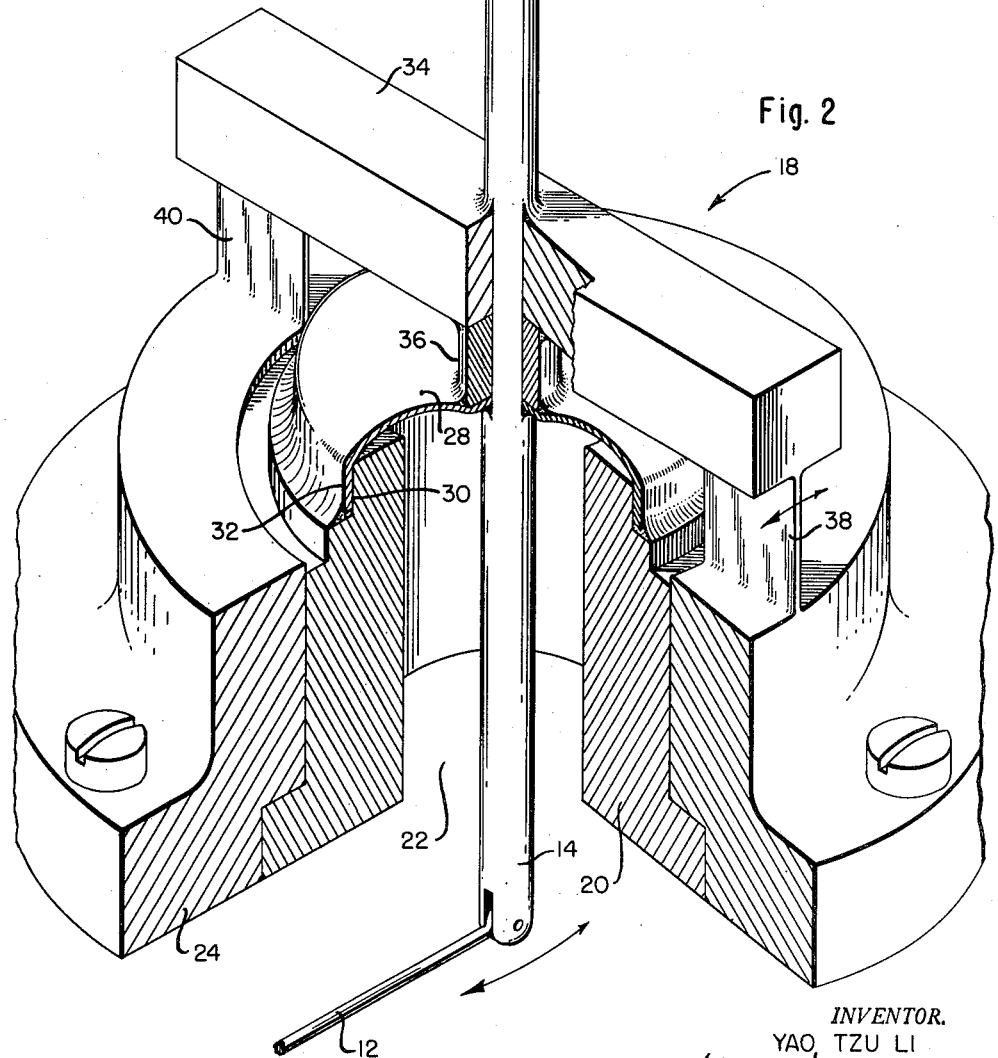
INVENTOR.
YAO TZU LI
BY
ATTORNEYS United States Patent Office 2,781,665
Patented Feb. 19, 1957

2,781,665

MOTION TRANSMITTING MEANS FOR PRESSURE DEVICES

Yao T. Li, Watertown, Mass.

Application January 23, 1953, Serial No. 332,975

5 Claims. (Cl. 74—18.1)

The present invention relates to motion-transmitting devices and particularly to a device for transmitting force or motion from a sealed region to an external point.

In certain applications as, for example, in the measurement of physical quantities within a chamber at high pressure, considerable difficulty has been experienced in transmitting force or motion from a responsive device within the chamber to external indicating or recording equipment. Another example is the transmission of data from a sealed region containing reactive chemicals.

The present invention has as its object the provision of a force or motion transmitting device of high accuracy unaffected by the pressure or other conditions existing within the chamber, and capable of being utilized with apparatus in which a very high pressure difference may exist between the interior of the chamber and the exterior thereof.

With the foregoing and other objects in view as will hereinafter appear, the present invention comprises the force or motion transmitting apparatus hereinafter described and particularly defined in the claims.

In the accompanying drawings:

Fig. 1 is a diagram illustrating the present invention as a motion transmitting device from a region of high pressure; and Fig. 2 is a perspective view, taken in partial section and on a greatly enlarged scale, illustrating the force transmitting device of the invention.

In Fig. 1 is shown an example of measuring equipment to which the present invention is adapted. As shown in Fig. 1, there is duct 6 containing an orifice plate 8 and it is desired to measure the pressure drop across the orifice. The pressure within the duct may be very high while the pressure drop across the orifice may be fairly small. As an example, the pressures on opposite sides of the duct may be 1,000 p. s. i. and 999 p. s. i. respectively, and it is desired to measure the pressure difference of approximately 1 p. s. i. with considerable accuracy. A diaphragm 10 is responsive to pressure on opposite sides and operates through a link 12 to move a rod 14 to actuate an external measuring instrument indicated diagrammatically at 16. The present invention comprises apparatus shown at 18 and to be presently described in detail, whereby the motion of the diaphragm may be transmitted to the device 16 with high accuracy. It will be understood that the construction of the device 18 must be such as to seal against the high pressure, which must not affect the accuracy of the differential pressure reading.

Referring now to Fig. 2, which shows the apparatus 18 on a greatly enlarged scale, it comprises an inner cylinder 20 having an internal opening 22 communicating with the high pressure in the chamber. The cylinder 20 is held in position by a bolting flange 24 which may be secured to a suitable wall of the chamber itself.

A sealing diaphragm 28 of considerable strength and resistance to pressure is mounted on the cylinder 20. To this end the cylinder is preferably provided at its upper end with a sealing flange 30, and a downwardly extending rim 32 of the diaphragm is securely welded to the flange as shown in Fig. 2. The diaphragm is preferably domed to provide high resistance to bursting pressure. It will be observed from Fig. 2 that the center of the diaphragm is at or near the same level as that part of the rim 32 which engages the upper part of the sealing flange 30, while the annular portion between the center and the rim is of dome construction.

Overlying the diaphragm 28 is a beam 34 which is shown as having a square section, although it may be of familiar I-section or of any suitable shape to provide high resistance to bending moments. The beam is adapted to provide high resistance to flexure of the diaphragm, and it may engage the diaphragm itself, but as shown in Fig. 2, it is preferably secured to a collar 36 which in turn is welded to the center portion of the diaphragm. At its ends the beam is mounted by means of flexible metal strips 38 and 40 which are of high tensile strength and are secured to the upper surface of the frame 24. The strips 38 and 40 are of adequate tensile strength to support the beam against the force exerted through the internal pressure of the diaphragm, and are flexible to permit bending in the direction as indicated by the arrows.

The strips 38 and 40 may be welded to the member 26 and to the beam 34 or these parts may be suitably machined in one piece.

As shown in Fig. 2, the link 12 which connects with the pressure responsive diaphragm 10 of Fig. 1 (or to any other responsive device which may be within the pressure chamber) is connected to a force transmitting rod or member shown at 14. The rod 14 passes through the collar 36 and is suitably welded to the diaphragm, to the collar and also to the beam 34. An outer force transmitting member 42 is suitably secured to the beam 34. In the preferred construction the members 14 and 42 form a single rod which passes through suitable openings in the diaphragm, the collar and the beam, and is suitably secured to all of them. An indicating rod or link 44 is connected with the upper end of the member 42 and is adapted to connect with any suitable indicating, recording or servo devices.

It will be noted that the links 12 and 44 are both normal to the plane of the flexible mounting strips 38 and 40, while the force transmitting members 14 and 42 are in the plane of said members. It is sufficient for the members 14 and 42 to have a rocking motion in a plane which is perpendicular to the plane of the mounting strips 38 and 40, and any suitable connections thereto, as represented by the links 12 and 44, may be provided.

The sealing diaphragm 28 is preferably dished or arched as indicated in Fig. 2, whereby the diaphragm itself provides substantial resistance to the internal pressure. The diaphragm is not required to have, and in fact is restrained against, any motion longitudinally of the members 14 and 42, and is required to underto only a slight flexure due to the rocking motion of the force-transmitting members. The apparatus therefore provides for adequate resistance to extremely high bursting pressures while permitting accurate transmission of small forces which are unaffected by the conditions existing internally of the sealed region.

Although the present invention may be made of any suitable size, depending on its conditions of use, it will be understood that a small size will generally be preferred, especially to reduce inertia effects when fluctuating phenomena are being measured. Usually a diameter of one inch or less will be found useful, but the apparatus is shown on an enlarged scale in Fig. 2 for purposes of illustration.

Having thus described my invention, I claim:

1. A motion transmitting device for a region sealed under high pressure, comprising a frame, a sealing diaphragm having a rim portion secured to the frame, a beam spanning the diaphragm and having a connection to the central portion thereof to resist outward flexure of the diaphragm under pressure, the diaphragm having its central portion at or near the same level as the line of engagement between the rim and the frame support members of high tensile strength connecting the beam at its ends to the frame, and motion transmitting means connected internally to the diaphragm and externally to the beam, said support members being flexible to permit rocking motion of the diaphragm and beam.

2. A motion transmitting device for a region sealed under high pressure, comprising a frame, a sealing diaphragm having a rim portion secured to the frame, a beam spanning the diaphragm and having a connection to the central portion thereof to resist outward flexure of the diaphragm under pressure, the diaphragm having its central portion at or near the same level as the line of engagement between the rim and the frame support members of high tensile strength connecting the beam at its ends to the frame, motion transmitting means connected internally to the diaphragm and externally to the beam, said support members being flexible to permit rocking motion of the diaphragm and beam, and means for moving said transmitting members in a plane perpendicular to the plane of the support members.

3. A motion transmitting device for a sealed region comprising a frame, a diaphragm secured to the frame to seal said region, a beam spanning the diaphragm and arranged to resist outward or inward flexure thereof, flexible metal strips of high tensile strength, said strips being disposed in a plane and connecting the beam at its opposite ends to the frame, and motion transmitting members movable in a plane perpendicular to the plane of said strips to cause a rocking motion of said diaphragm and beam.

4. A motion transmitting device for a region sealed under high pressure, comprising a frame, a sealing diaphragm secured to the frame, a beam spanning the diaphragm and having a connection to the central portion thereof to resist outward flexure of the diaphragm under pressure, flexible metal strips of high tensile strength, said strips being disposed in a plane and connecting the beam at its opposite ends to the frame, and motion transmitting members movable in a plane perpendicular to the plane of said strips to cause a rocking motion of said diaphragm and beam.

5. A motion transmitting device for a region sealed under high pressure comprising a frame, a sealing diaphragm having a rim portion secured to the frame, a beam spanning the diaphragm and having a connection to the central portion thereof to resist outward flexure of the diaphragm under pressure, the central portion of the diaphragm being at or near the same level as the line of engagement of the rim portion with the frame, the annular portion between the central portion and the rim portion of the diaphragm being of dome construction, flexible metal strips of high tensile strength, said strips being disposed in a plane and connecting the beam at its opposite ends to the frame, and motion transmitting members movable in a plane perpendicular to the plane of said strips to cause a rocking motion of said diaphragm and beam.

References Cited in the file of this patent

FOREIGN PATENTS

| | | |
|---|---|---|
| 376,450 | Italy | Nov. 15, 1939 |
| 635,731 | Great Britain | Apr. 12, 1950 |